United States Patent [19]

Diesel et al.

[11] Patent Number: 4,723,273

[45] Date of Patent: Feb. 2, 1988

[54] DISCRETIONARY CALL FORWARDING

[75] Inventors: Michael E. Diesel, Newark; Louis M. Taff, Warrenville, both of Ill.

[73] Assignee: American Telephone and Telegraph Company, AT&T Bell Laboratories, Murray Hill, N.J.

[21] Appl. No.: 779,863

[22] Filed: Sep. 25, 1985

[51] Int. Cl.⁴ .............................................. H04M 3/58
[52] U.S. Cl. ..................................... 379/211; 379/210
[58] Field of Search .......... 179/18 BE, 18 B, 18 BD, 179/18 AD, 18 BG, 27 FG, 27 D, 27 FC; 379/211, 210, 214, 157

[56] References Cited

U.S. PATENT DOCUMENTS 4,296,282 10/1981 O'Neil et al. ........................ 379/164
4,436,962 3/1984 Davis et al. ............................ 179/18
4,529,841 7/1985 Andersson et al. ................. 379/213

OTHER PUBLICATIONS

D. L. Huebner, "Intelligent Telephones and Generic Switching: A Distributed Processing PABX Architecture", Proceedings, vol. 2, Tuesday, May 8, 1984.

Primary Examiner—James L. Dwyer
Attorney, Agent, or Firm—Ross T. Watland

[57] ABSTRACT

A call forwarding method that allows the called party to selectively forward individual alerting calls based, for example, on the calling party identity or on how busy the called party is at any given time, but without requiring the called party to first answer the calls. The called party can effect the transfer even though engaged in conversation with someone else.

66 Claims, 8 Drawing Figures

DISCRETIONARY CALL FORWARDING

TECHNICAL FIELD

This invention relates to call forwarding features in communication systems and, more particularly, to the selective forwarding of telephone calls on an individual call basis under the control of the called party.

BACKGROUND OF THE INVENTION

As stored-program controlled switching systems have evolved, a wide variety of useful features have been developed to extend the communication capabilities such systems provide. For example, a well-known call forwarding feature enables a customer to receive incoming calls at another location by activating the call fowarding service and providing a forward-to directory number to the switching system. A call transfer service allows a called party to tranfer incoming calls appropriately based on brief conversations with the calling parties.

Although both call forwarding and call transfer are very useful in many applications, consider the following scenario. A senior sales repesentative has developed a loyal customer following over a period of several years. Since he now has more customers than he can handle effectively, he would prefer to have incoming calls from most of his customers handled by several associates, at least during busy times. He could activate call forwarding, but then all his calls would be forwarded, including personal calls as well as calls from his most important customers. A further disadvantage is that all calls would be forwarded to only one of his associates. Alternatively, he could answer all incoming calls himself and transfer them to his associates only when appropriate. Not only would this be time consuming, but in addition, many of his customers tend to engage in long conversations and would be offended by being transferred abruptly, particularly knowing that the representative they called is transferring them but remains available to answer other incoming calls.

In view of the foregoing, a call forwarding feature is needed that allows a called party to exercise discretion in forwarding individual calls based, for example, on the calling party identity or on how busy the called party is at any given time, but without requiring the called party to first answer the calls. It would also be highly desirable to allow the called party to effect the forwarding even though presently engaged in conversation with someone else.

SUMMARY OF THE INVENTION

The foregoing need is met and a technical advance is achieved in accordance with the principles of the invention in an illustrative call forwarding method where is signaling channel, advantageously out of the voice communication band, is used to convey a request including forward-to information from a called station set to an integrated services digital network (ISDN) switching arrangement to forward a call in an alerting state at the called station set, without the called party answering the call or even interrupting an ongoing conversation. The out-of-band signaling channel is also used to transmit calling party information from the switching arrangement to the station set for use by the called party in deciding whether to forward the call and to determine the appropriate call destination.

According to the illustrative method, the switching arrangement transmits a message defining an incoming call to a first station set to place the set in an alerting state. Without the call being answered, the station set responds to a command by transmitting a request including forward-to information to the switching arrangement to forward the call. The switching arrangement then attempts to complete the call to another station set based on the forward-to information.

This discretionary call forwarding feature, also referred to herein as the SEND THIS CALL feature, is implemented so as to maximize its usefulness to customers while limiting any additional call processing requirements imposed on the switching arrangement. Information concerning the station set to which the call is to be forwarded is referred to herein as forward-to-information. The forwarding request typically includes such forward-to information entered, for example, at a station set keypad. After receiving a forwarding request, the switching arrangement performs checks for, among other things, verifying that the called party is entitled to the forwarding service (for billing purposes). The verification is advantageously performed before translating the forward-to-information or effecting the forwarding of the call. Once the new terminating station set is determined, busy/idle and group data are verified so that the call is forwarded only when the new terminating station set is idle, i.e., available to receive a voice call, and in the same user group as the called station set.

The out-of-band signaling channel is used to advantage not only to transmit calling party information for use in deciding to forward a call, but also to convey forwarding party information to assist the answering party in answering the call intelligently.

If the attempt to complete the call to the new terminating station set is unsuccessful for a predetermined time period, the switching arrangement again attempts to complete the call to the originally called station set.

An associated call retrieval feature allows a forwarded call to be retrieved by the originally called station set, advantageously at any time during its progress. For example, if the call has already been answered, the forwarding party is bridged onto the conversation. If the call has not been answered, the forwarding is canceled and the call is completed to the called party as originally intended. The call retrieval feature is activated by pushing a button at the originally called station set. A call reference value, stored either by the station set or by the switching arrangement, is used to associate the call retrieval activation with the previously fowarded call. If the forwarded call has already been terminated, a message is returned to the station set indicating that the attempted feature activation was successful.

BRIEF DESCRIPTION OF THE DRAWING

A more complete understanding of the invention may be obtained from a consideration of the following description when read in conjunction with the drawing in which.

DETAILED DESCRIPTION

Figure 1:
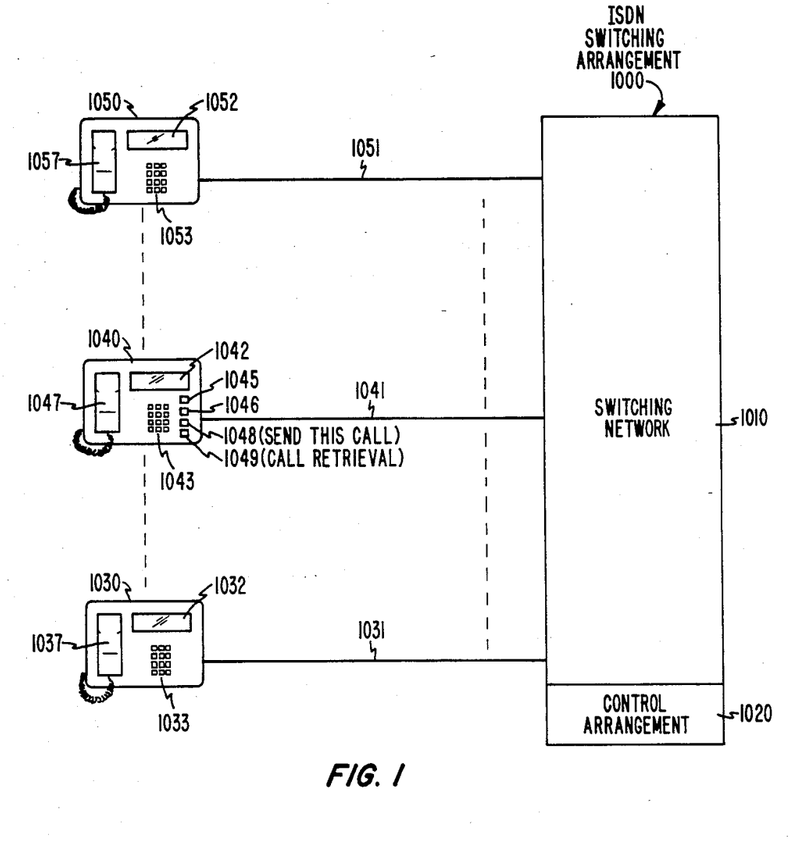
FIG. 1 is a diagram of an ISDN switching arrangement serving a plurality of ISDN station sets, at least one of which is assigned an exemplary discretionary call forwarding feature in accordance with the present invention.

The principles of the present invention are described in the context of an integrated services digital network (ISDN) switching arrangement 1000 (FIG. 1). An integrated services digital network is defined as a network evolved from the telephony integrated digital network that provides end-to-end digital connectivity to support a wide range of services, including voice and non-voice services, to which users have access by a limited set of standard multipurpose customer interfaces. One example of ISDN switching arrangement 1000 is the integrated packet switching and circuit switching system disclosed in U.S. Pat. 4,592,048 issued to M. W. Beckner et al.; on May 27, 1986, although the invention is also applicable where switching arrangement 1000 is an interconnected network of switching systems. Switching arrangement 1000 includes a switching network 1010, which represents, in the above-referenced exemplary integrated packet switching and circuit switching system, a plurality of time-slot interchange units and a time-multiplexed switch to provide circuit-switched connections, and a plurality of packet switching units (interconnected via the time-slot interchange units and time-multiplexed switch) to provide packet-switched connections. Switching arrangement 1000 further includes control arrangement 1020 which represents the control portion of the above-referenced exemplary switching system, including a central control and a plurality of control units that intercommunicate via predetermined channels of the time-multiplexed switch and a control distribution unit.

Also shown in FIG. 1 are three ISDN station sets (user terminals) 1030, 1040 and 1050 which are connected to switching arrangement 1000 via associated user access lines (digital subscriber lines) 1031, 1041 and 1051. Although only three such sets are explicitly shown, it is understood that switching arrangement 1000 interconnects a larger plurality of ISDN sets and may interconnect other conventional analog station sets as well. As shown in FIG. 1, each ISDN station set includes a handset, a telephone keypad and a display for visually displaying messages. Station sets 1030, 1040 and 1050 include handsets 1037, 1047 adn 1057, keypads 1033, 1043 and 1053 and displays 1032, 1042 and 1052. Station set 1040 further includes SEND THIS CALL and CALL RETRIEVAL feature activation buttons 1048 and 1049 as well as two call appearance buttons 1045 and 1046 such that a second incoming call can be in the alerting state at station set 1040 during the existence of a first call.

Each ISDN station set, e.g., 1030, transmits information to and receives information from switching arrangement 1000 in two 64 kilobits per second channels referred to as B-channels and in one 16 kilobits per second channel referred to as a D-channel. In the present embodiment, one B-channel is used to convey digitized voice samples at the rate of 8000, eight-bit samples per second and the other B-channel is used to convey data at a rate of 64 kilobits per second. (However, each B-channel could be used for either voice or data traffic.) Each B-channel is separately circuit-switched by switching network 1010 to other station sets (either ISDN or analog). The D-channel is used both to convey signaling packets to effect message signaling between ISDN station sets and control arrangement 1020, and to convey data packets between different ISDN station sets. The D-channel is packet-switched by switching network 1010 either to other ISDN station sets, or to control arrangement 1020 which controls the establishment of both circuit-switched calls and packet-switched calls within switching arrangement 1000. The message signaling between ISDN station sets and control arrangement 1020 can be of either the functional or stimulus types. Functional signaling involves a degree of intelligent processing in its generation or analysis whereas stimulus signaling is either generated as a result of a single event at an ISDN station set, e.g., a key depression, or contains a basic instruction from switching arrangement 1000 to be executed by the station set. The message signaling is referred to as out-of band signaling since it occurs in the D-channel outside the bandwidth of the voice communication.

In the present exemplary embodiment, information is conveyed between an ISDN station set, e.g., 1030, and switching arrangement 1000 via a four-wire, user access line 1031 using one pair of wires for each direction of transmission. User access line 1031 transmits a serial bit stream at the rate of 192 kilobits per second which comprises 144 kilobits per second for the above-mentioned two 64 kilobits per second B-channels and one 16 kilobits per second D-channel and which further comprises 48 kilobits per second used for a number of functions including framing, DC balancing, control and maintenance. User access line 1031 represents that is referred to by the International Telegraph and Telephone Consultative Committee (CCITT) as the T-interface. The use of the T-interface is only exemplary, however, as the invention is equally applicable to systems using other access methods.

Figure 3:
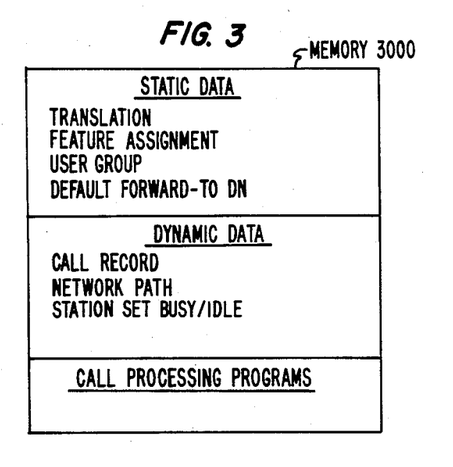
FIG. 3 is memory map for memory facilities included in a control portion of the switching arrangement of FIG. 1.
Figure 4:
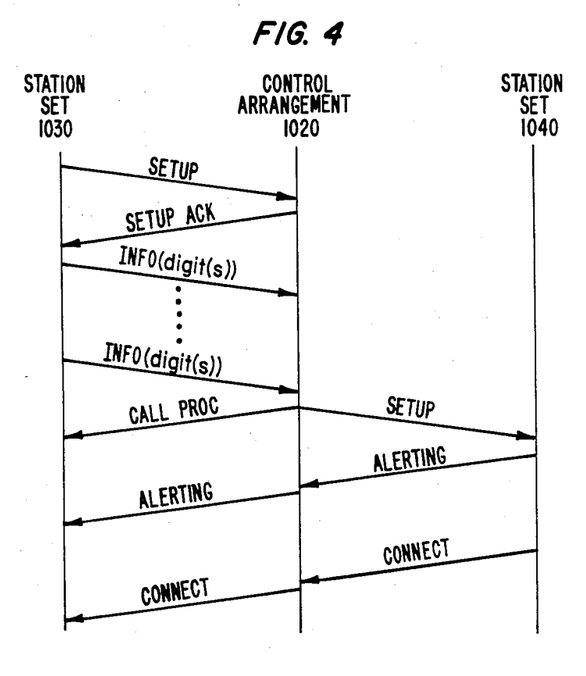
FIG. 4 is a message sequence diagram for the setup of a standard voice call in the switching arrangement of FIG. 1.

Signaling packets are conveyed between the station sets and control arrangement 1020 enclosed in level 2 (link-level) frames in accordance, for example, with the standard LAPD protocol. The exemplary signaling messages used for the control of circuit-switched voice calls are in accordance with CCITT Recommendation I.451. The use of such signaling messages is illustrated by considering the following example of a standard voice call from station set 1030 to station set 1040. Assume that a user at station set 1030 goes off-hook by lifting handset 1037. Station set 1030 initially transmits a SETUP message (FIG. 4) to control arrangement 1020. The SETUP message includes a call reference value (CRV) selected by station set 1030. The selected CRV is included in all subsequent signaling messages between station set 1030 and control arrangement 1020 concerning the particular call. Control arrangement 1020 includes memory 3000 (FIG. 3), which may be implemented, for example, using a plurality of memories distributed throughout switching arrangement 1000, for storing both static and dynamic data needed for processing calls as well as a number of call processing programs. Control arrangement 1020 stores the received CRV in a call record stored in a data table or relation in the dynamic data section of memory 3000. Control arrangement 1020 then returns a SETUP ACK message (FIG. 4) to station set 1030. The user at station set 1030 then enters via keypad 1033 the directory number assigned to line 1041 and station set 1030 transmits a sequence of INFO messages each including one or more digits of the directory number. Control arrangement 1020 uses the received directory number as a key to translation data stored in memory 3000 and determines the identity of the terminating line 1041 for the call. Control arrangement 1020 selects a CRV for use in identifying the call in the signaling messages to be conveyed between control arrangement 1020 and station set 1040 and stores the selected CRV in the call record of memory 3000. (Note that the CRVs used for control communication with the originating and terminating station sets are in general different.) Control arrangement 1020 also reads network 1010 path data stored in memory 3000 and, if a network 1010 path is available to be assigned to the call, control arrangement 1020 transmits a SETUP message informing station set 1040 of the incoming call. The SETUP message includes calling party identity information, e.g., the directory number assigned to line 1031, or alternatively the name of the calling party if such information is available to control arrangement 1020. Station set 1040 visually displays such calling party identity information on display 1042. Control arrangement 1020 also returns a CALL PROC message to station set 1030 indicating that a call is being set up in response to the received directory number. In response to the SETUP message, station set 1040 enters an alterting state and begins ringing. Station set 1040 then returns an ALERTING message to control arrangement 1020, which message is also conveyed back to originating station set 1030. Subsequently when handset 1047 is lifted to answer the call, station set 1040 transmits a CONNECT message to control arrangement 1020, which effects the completion of the assigned network 1010 path and then tansmits the CONNECT message on to station set 1030. The two parties can now communicate.

Figure 2:
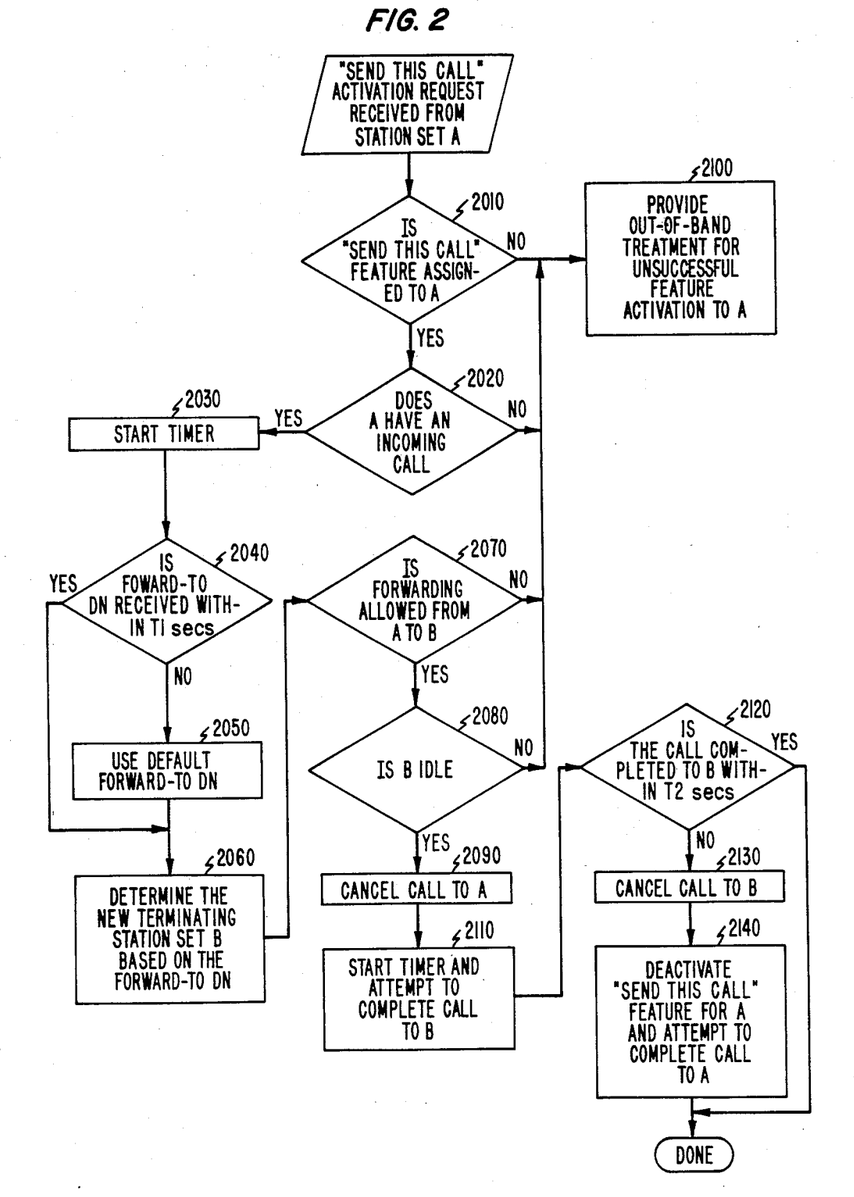
FIG. 2 is a flow chart of a call processing program used to implement the exemplary call forwarding feature.
Figure 5:
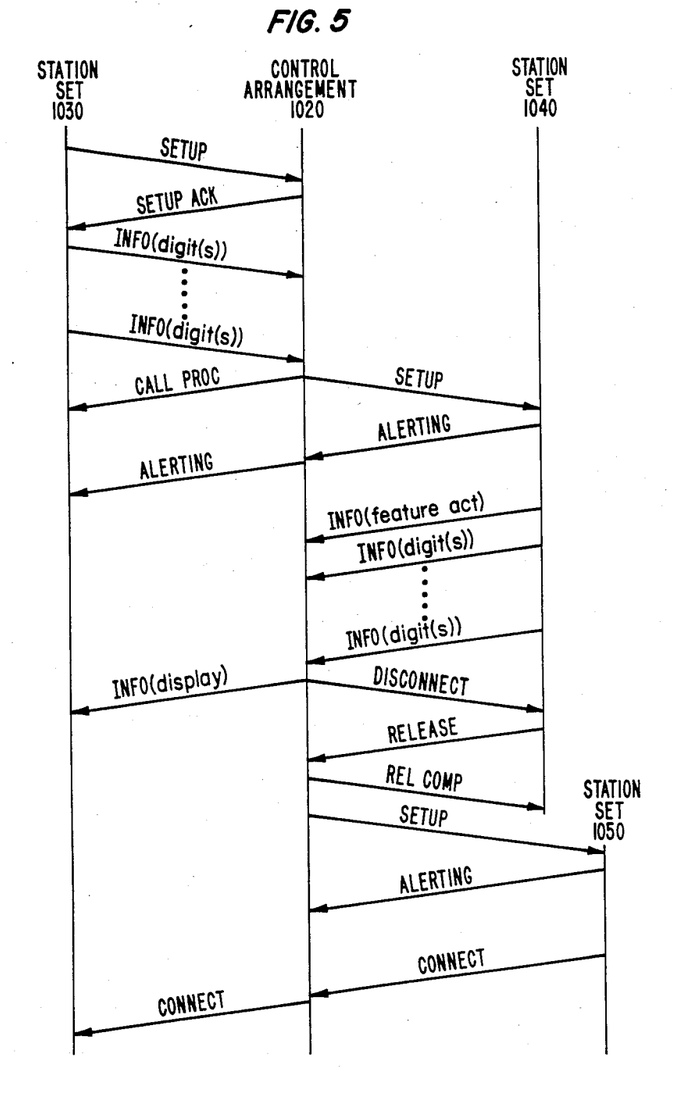
FIGS. 5 through 8 are message sequence diagrams for several call setup examples illustrating the operation of the exemplary call forwarding feature and an associated call retrieval feature.
Figure 6:
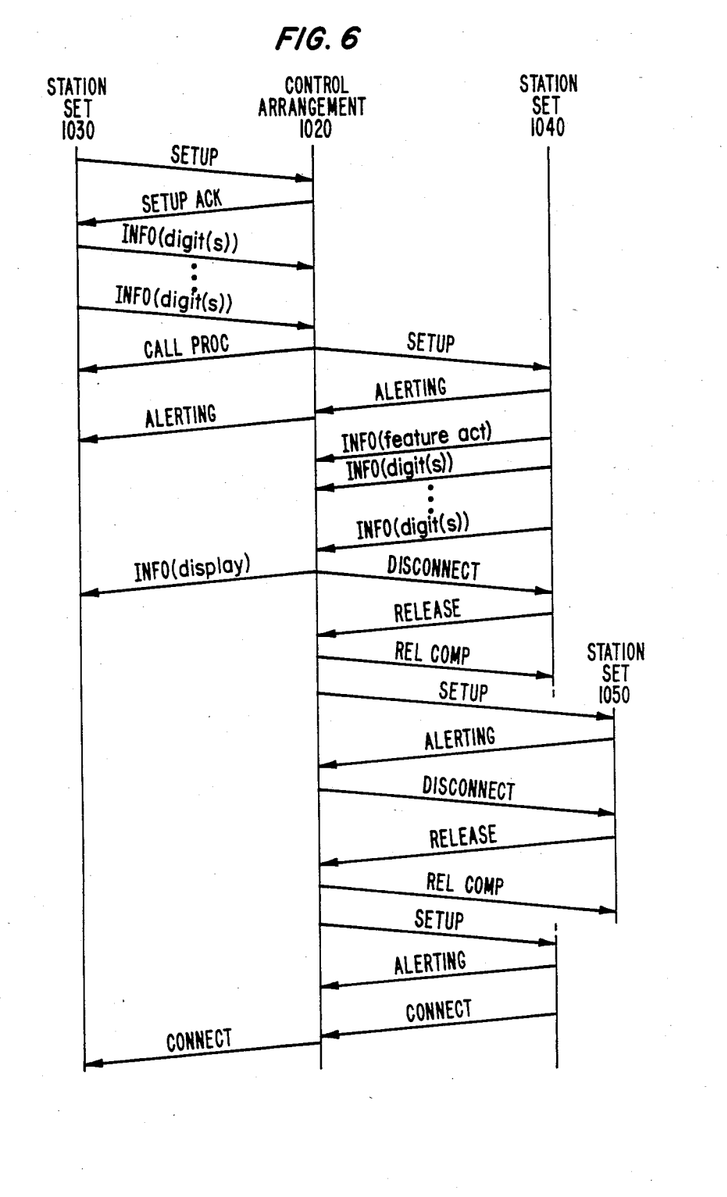

In accordance with the present invention, each of the ISDN station sets served by switching arrangement 1000 may be assigned a discretionary call forwarding feature referred to herein as the SEND THIS CALL feature. The feature is activated when the called station set is alerting and without the call being answered and allows the called party to exercise discretion in forwarding individual calls based, for example, on the calling party identity, as displayed at the called station set, or on how busy the called party is at any given time. Consider the following variation on the previous example. After station set 1040 has returned the ALERTING message (FIG. 5), the called party determines based on the displayed calling party identity that the call should be forwarded to station set 1050. (Note that another voice call may be active at station set 1040 at this time.) The called party pushes the SEND THIS CALL feature activation button 1048 and then enters via keypad 1043 the directory number assigned to line 1051. Station set 1040 transmits an INFO message defining the requested activation of the SEND THIS CALL feature. (The activation of a particular feature such as the SEND THIS CALL feature is defined by the coding of an information element included in the INFO message.) Control arrangement 1020 responds to the INFO message by initiating the execution of a call processing program stored in memory 3000. A flow chart for the program is shown in FIG. 2. Execution begins with block 2010 where the feature assignment data is read from memory 3000 to determine whether the SEND THIS CALL feature is assigned to station set 1040. If the feature is assigned, execution proceeds to block 2020 and the incoming call data for station set 1040 is read from memory 3000 to verify the presence of an incoming call. If an incoming call is indicated, execution proceeds to block 2030 and a timer is started. In decision block 2040, a determination is made of whether a forward-to directory number is received from station set 1040 within a predetermined time of T1 seconds. As shown in FIG. 5, the digits of the forward-to directory number are received in a sequence of INFO messages. Assuming that the forward-to directory number is received within the predetermined time, execution proceeds to block 2060 (FIG. 2) where the translation data is read, using the forward-to directory number as a key, to determine the new terminating line 1051 and the associated station set 1050. Following the translation of the forward-to directory number, execution continues with block 2070 where the user group data is read from memory 3000 to determine whether station sets 1040 and 1050 are in the same user group. In the present example, the call is allowed to be sent to only other members of the same user group. Upon determining that station sets 1040 and 1050 are in the same user group, execution proceeds to block 2080 and the busy/idler data for station set 1050 is read from memory 3000 to determine whether station set 1050 is presently available to receive a voice call in one of the B-channels. Upon determining that station set 1050 is idle, execution proceeds to block 2090 where the call to station set 1040 is canceled. Control arrangement 1020 transmits an INFO message (FIG. 5) to station set 1030 resulting in the visual display of an appropriate message such as "Call Being Forwarded" on display 1032. (The provision of such information to the calling party is not necessary for the proper operation of the feature and, in fact, some customers may prefer that no information is provided to the calling party.) Control arrangement 1020 and station set 1040 exchange a sequence of DISCONNECT, RELEASE, and RELCOMP messages to disconnect station set 1040 from the call. The receipt of the RELCOMP message by station set 1040 results in the visual display of a message such as "Call Being Forwarded To 3572" on display 1042 defining th forward-to directory number. Execution proceeds to block 2110 (FIG. 2), a timer is started and control arrangement 1020 attempts to complete the call by transmitting a SETUP message (FIG. 5) to station set 1050 including a newly selected CRV. Station set 1050 responds by initiating ringing and returning an ALERTING message to control arrangement 1020. The ringing at station 1050 set may be distinctive so as to define a priority call since the calling party has already been waiting for the call to be answered for some time. Station set 1050 displays a message such as "3570 Forwarding A Call From 607938 on display 1052 defining both the calling and the called directory numbers to aid the person answering the call. When the call is answered at station set 1050, station set 1050 transmits a CONNECT message to control arrangement 1020. The CONNECT message is further transmitted to station set 1030 and the voice communication path between station sets 1030 and 1050 is completed. Execution proceeds from block 2110 (FIG. 2) to decision block 2120 and a determination is made of whether the call was successfully completed to station set 1050 within a predetermined time of T2 seconds. If so, the call setup has been completed. The SEND THIS CALL feature is subsequently deactivated for station set 1040 at the termination of the call. If the call setup is not successfully completed, as for example if the call is not answered within the predetermined time, execution proceeds to block 2130 and the call to station set 1050 is canceled. Control arrangement 1020 and station set 1050 exchange the sequence of DISCONNECT, RELEASE and RELCOMP message (FIG. 6). Execution proceeds to block 2140 (FIG. 2) and the SEND THIS CALL feature is deactivated for station set 1040. Control arrangement 1020 again attempts to complete the call to station set 1040 by transmitting a SETUP message thereto. Station set 1040 returns an ALERTING message to control arrangement 1020, followed by a CONNECT message when the call is answered. The balance of the call setup proceeds in the above-described manner and a voice communication path is established between station sets 1030 and 1040.

A negative determination in any one of the decision blocks 2010, 2020, 2070, 2080 results in a branch to block 2100 and a message is transmitted from control arrangement 1020 to station set 1040 indicating that the attempt to activate the SEND THIS CALL feature was unsuccessful. By reading the feature assignment and incoming call data prior to performing translation in block 2030, the attempt to forward the call can be aborted without requiring unnecessary processing.

A negative determination in decision block 2040, when the forward-to directory number is not received within the predetermined time, results in a branch to block 2050 where a default forward-to directory number for station set 1040 is read from memory 3000 and used in forwarding the call.

If station set 1040 has a speed calling feature, the user at station set 1040 can push the appropriate speed calling button rather than entering the directory number after pushing the SEND THIS CALL button 1048.

Figure 7:
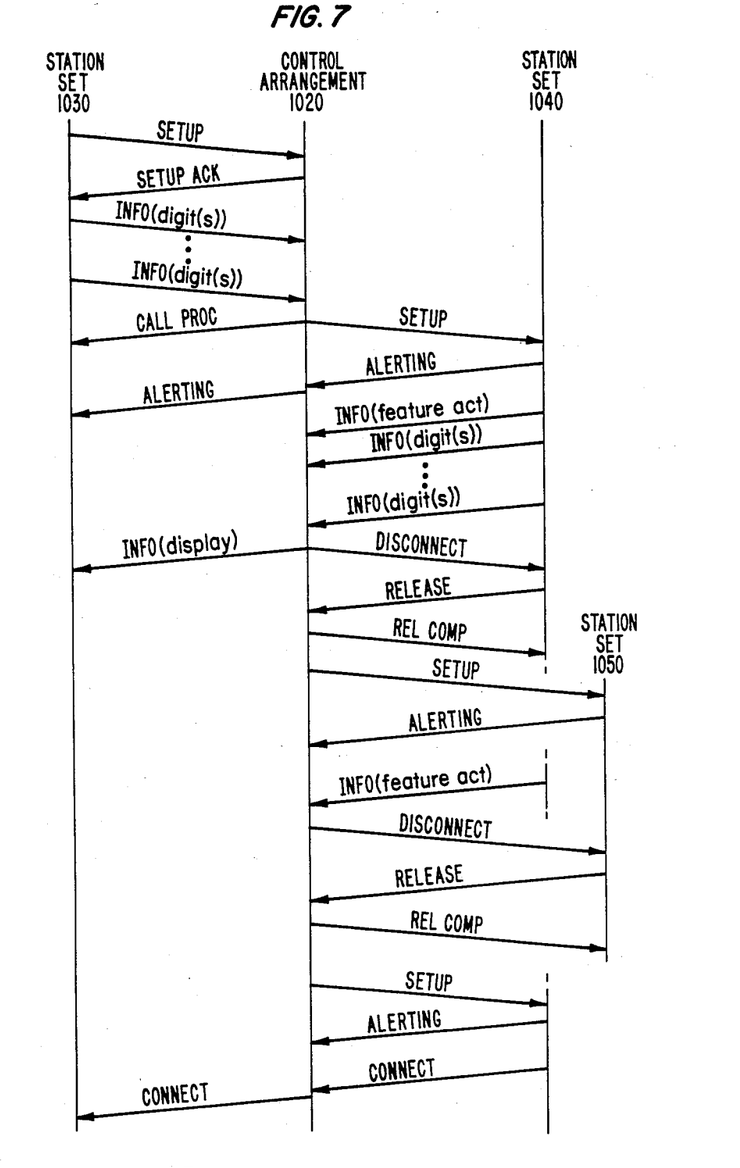

The user at station set 1040 can also retrieve a call after it has been forwarded. The CRV associated with a call forwarded using the SEND THIS CALL feature is stored, either by station set 1040 or by control arrangement 1020, for use in subsequently retrieving the call. Consider the following variation on the previous example. Before the user at station set 1050 answers the call, the user at station set 1040 pushes the CALL RETRIEVAL button 1049. Station set 1040 transmits an INFO message (FIG. 7) defining the activation of call retrieval to control arrangement 1020. Control arrangement 1020 and station set 1050 exchange the sequence of DISCONNECT, RELEASE and RELCOMP messages and the call to station set 1050 is cancelled. Control arrangement 1020 transmits a SETUP message to station set 1040, which responds with an ALERTING message followed by a CONNECT message and the voice communciation path is esablished between station sets 1030 and 1040.

Figure 8:
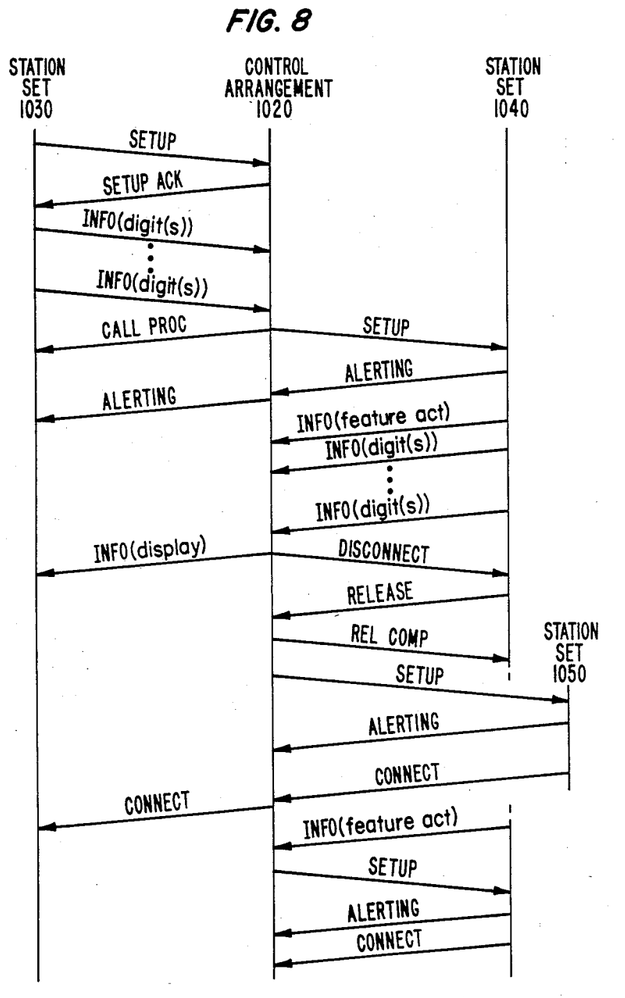

As a second variation on the example, assume that the user at station set 1040 pushes the CALL RETRIEVAL button 1049 after the user at station set 1050 has answered and a voice communication path has been established between station sets 1030 and 1050. Station set 1040 transmits an INFO message (FIG. 8) defining the activation of call retrieval to control arrangement 1020. Control arrangement 1020 responds by transmitting a SETUP message to station set 1040. Station set 1040 responds with ALERTING and CONNECT messages and station set 1040 is bridged onto the call.

If the user at station set 1040 pushes the CALL RETRIEVAL button 1049 after a forwarded call has been terminated, control arrangement 1020 transmits a message to station set 1040 indicating that the attempt to activate the CALL RETRIEVAL feature is unsuccessful.

It is important to note that station sets 1030 and 1050 could be analog rather than ISDN sets. Conventional in-band signaling would then be used between control arrangement 1020 and station sets 1030 and 1050.

It is to be understood that the above-described discretionary call forwarding method is merely illustrative of the principles of the present invention and that many variations may be devised by those skilled in the art without departing from the spirit and scope of the invention.

What is claimed is:

1. A call forwarding method for use by a switching arrangement interconnecting a plurality of station sets comprising transmitting a message for an incoming call to one station set to place said one station set in an alerting state, without said call being answered at said one station set, receiving a request, transmitted from said one station set to forward said call in response to a manual command at said one station set, said request including forward-to information, and attempting to complete said call to another station set based on said forward-to information.

2. A method in accordance with claim 1 wherein said one station set is connected to said switching arrangement by at least one voice channel and at least one signaling channel out of band with respect to said voice channel, wherein said message is transmitted to said one station set in said signaling channel and said message defines that said call is to be completed to said voice channel, and wherein said request is received from said one station set in said signaling channel.

3. A method in accordance with claim 2 wherein said attempting to complete step comprises determining a terminating station set in response to said forward-to information and attempting to complete said call to said determined terminating station set.

4. A method in accordance with claim 2 wherein said switching arrangement further comprises memory means for storing busy/idle data for said station sets and wherein said attempting to complete step comprises determining a terminating station set in response to said forward-to information, reading the busy/idle data for said determined terminating station set and attempting to complete said call to said determined terminating station set only when said read busy/idle data defines that said determined terminating station set is idle.

5. A method in accordance with claim 4 further comprising after unsuccessfully attempting to complete said call to said determined terminating station set for a predetermined time, attempting to complete said call to said one station set.

6. A method in accordance with claim 4 further comprising receiving a request to pick up said call from said one station set, when said call has not yet been successfully completed to said determined terminating station set, responding to said request to pick up said call by stopping the attempt to complete said call to said determined terminating station set and attempting to complete said call to said one station set.

7. A method in accordance with claim 6 further comprising when said call has been successfully completed to said determined terminating station set, responding to said request to pick up said call by bridging said one station set onto said call.

8. A method in accordance with claim 1 wherein said receiving step is performed during the existence of another call to said one station set.

9. A method in accordance with claim 1 wherein said attempting to complete step comprises determining a terminating station set in response to said forward-to information and attempting to complete said call to said determined terminating station set.

10. A method in accordance with claim 1 wherein said switching arrangement further comprises memory means for storing busy/idle data for said station sets and wherein said attempting to complete step comprises determining a terminating station set in response to said forward-to information, reading the busy/idle data for said determined terminating station set and attempting to complete said call to said determined terminating station set only when said read busy/idle data defines that said determined terminating station set is idle.

11. A method in accordance with claim 1 wherein said switching arrangement further comprises memory means for storing group data defining groups of said station sets, and wherein said attempting to complete step comprises determining a terminating station set in response to said forward-to information, reading the group data for said determined terminating station set and attempting to complete said call to said determined terminating station set only when said read group data defines that said determined terminating station set is in the same group with said one station set.

12. A method in accordance with claim 1 wherein said switching arrangement further comprises memory means for storing incoming call data for said station sets, wherein said method further comprises before said attempting to complete step is performed, reading the incoming call data for said one station set, and wherein said attempting to complete step is performed only when said read incoming call data defines an incoming call for said one station set.

13. A method in accordance with claim 1 wherein said switching arrangement further comprises memory means for storing data defining whether each of said station sets is assigned to SEND THIS CALL feature, wherein said method further comprises before said attempting to complete step is performed, reading the feature assignment data for said one station set, and wherein said attempting to complete step is performed only when said read feature assignment data defines that said SEND THIS CALL feature is assigned to said one station set.

14. A method in accordance with claim 1 further comprising after unsuccessfully attempting to complete said call to said another station set for a predetermined time, attempting to complete said call to said one station set.

15. A method in accordance with claim 1 further comprising transmitting calling party information to said one station set.

16. A method in accordance with claim 1 further comprising transmitting forwarding party information to said another station set.

17. A method in accordance with claim 1 further comprising receiving a request to pick up said call from said one station set, when said call has not yet been successfully completed to said another station set, responding to said request to pick up said call by stopping the attempt to complete said cell to said another station set and attempting to complete said call to said one station set.

18. A method in accordance with claim 17 further comprising when said call has been successfully completed to said another station set, responding to said request to pick up said call by bridging said one station set onto said call.

19. A call forwarding method for use in a switching arrangement interconnecting a plurality of station sets comprising one station set, in response to an incoming call from said switching arrangement and to a manual command at said one station set while said one station set is in an alerting state, and without said call being answered, transmitting a request to said switching arrangement to forward said call, said request including forward-to information, and said switching arrangement attempting to complete said call to another station set based on said forward-to information.

20. A method in accordance with claim 19 wherein said one station set is connected to said switching arrangement by at least one voice channel and at least one signaling channel out of band with respect to said voice channel, wherein said incoming call is to be completed to said voice channel and wherein said request is transmitted in said signaling channel.

21. A method in accordance with claim 20 wherein said attempting to complete step comprises determining a terminating station set in response to said forward-to information and attempting to complete said call to said determined terminating station set.

22. A method in accordance with claim 20 wherein said switching arrangement further comprises memory means for storing busy/idle data for said station sets and wherein said attempting to complete step comprises determining a terminating station set in response to said forward-to information, reading the busy/idle data for said determined terminating station set and attempting to complete said call to said determined terminating station set only when said read busy/i- dle data defines that said determined terminating station set is idle.

23. A method in accordance with claim 22 further comprising
after unsuccessfully attempting to complete said call to said determined terminating station set for a predetermined time, said switching arrangement again attempting to complete said call to said one station set.

24. A method in accordance with claim 22 further comprising
said one station set transmitting to said switching arrangement a request to pick up said call,
when said call has not yet been successfully compled to said determined terminating station set, said switching arrangement responding to said request to pick up said call by stopping the attempt to complete said call to said determined terminating station set and
said switching arrangement attempting to complete said call to said one station set.

25. A method in accordance with claim 24 further comprising
when said call has been successfully completed to said determined terminating station set, said switching arrangement responding to said request to pick up said call by bridging said one station set onto said call.

26. A method in accordance with claim 19 wherein said transmitting step is performed during the existence of another call to said one station set.

27. A method in accordance with claim 19 wherein said attempting to complete step comprises
determining a terminating station set in response to said forward-to information and
attempting to complete said call to said determined terminating station set.

28. A method in accordance with claim 19 wherein said switching arrangement further comprises memory means for storing busy/idle data for said station sets and wherein said attempting to complete step comprises
determining a terminating station set in response to said forward-to information,
reading the busy/idle data for said determined terminating station set and
attempting to complete said call to said determined terminating station set only when said read busy/idle data defines that said determined terminating station set is idle.

29. A method in accordance with claim 19 wherein said switching arrangement further comprises memory means for storing group data defining groups of said station sets, and wherein said attempting to complete step comprises
determining a terminating station set in response to said forward-to information,
reading the group data for said determined terminating station set and
attempting to complete said call to said determined terminating station set only when said read group data defines that said determined terminating station set is in the same group with said one station set.

30. A method in accordance with claim 19 wherein said switching arrangement further comprises memory means for storing incoming call data for said station sets, wherein said method further comprises
before said attempting to complete step is performed, said switching arrangement reading the incoming call data for said one station set,
and wherein said attempting to complete step is performed only when said read incoming call data defines an incoming call for said one station set.

31. A method in accordance with claim 19 wherein said switching arrangement further comprises memory means for storing data defining whether each of said station sets is assigned a SEND THIS CALL feature, wherein said method further comprises
before said attempting to complete step is performed, said switching arrangement reading the feature assignment data for said one station set,
and wherein said attempting to complete step is performed only when said read feature assignment data defines that said SEND THIS CALL feature is assigned to said one station set.

32. A method in accordance with claim 19 further comprising
after unsuccessfully attempting to complete said call to said another station set for a predetermined time, said switching arrangement again attempting to complete said call to said one station set.

33. A method in accordance with claim 19 wherein said one station set comprises display means for visually displaying information, said method further comprising
said switching arrangement transmitting calling party information to said one station set and
said one station set visually displaying said calling party information.

34. A method in accordance with claim 19 wherein said another station set comprises display means for visually displaying information, said method further comprising
said switching arrangement transmitting forwarding party information to said another station set and
said another station set visually displaying said forwarding party information.

35. A method in accordance with claim 19 further comprising
said one station set transmitting to said switching arrangement a request to pick up said call,
when said call has not been yet been successfully completed to said another station set, said switching arrangement responding to said request to pick up said call by stopping the attempt to complete said call to said another station set and
said switching arrangement attempting to complete said call to said one station set.

36. A method in accordance with claim 35 further comprising
when said call has been successfully completed to said another station set, said switching arrangement responding to said request to pick up said call by bridging said one station set onto said call.

37. A call forwarding method for a communication station set having a signaling channel out-of-band with respect to a voice channel comprising
receiving a message in said signaling channel defining an incoming call for said voice channel,
said station set responding to said message by entering an alerting state,
in response to a command at said station set, transmitting in said signaling channel a request to forward said call without said call being answered at said station set, said request including forward-to information, and obtaining a verification via said signaling channel that the forwarding of said call based on said forward-to information is in progress.

38. A method in accordance with claim 37 wherein said forward-to information comprises information dialed at said station set.

39. A method in accordance with claim 37 further comprising
after said obtaining step, transmitting in said signaling channel a request to pick up said call.

40. A method in accordance with claim 39 further comprising
when said call has not yet been successfully completed to another station set, receiving a message in said signaling channel to complete said call to said voice channel.

41. A method in accordance with claim 39 further comprising
when said call has been successfully completed to another station set, receiving a message in said signaling channel to bridge said voice channel onto said call.

42. A call forwarding method for use by a switching arrangement interconnecting a plurality of station sets comprising
transmitting a message for an incoming call to one station set to place said one station set in an alerting state,
receiving instructions including second station set identity data in response to a manual command at said one station set without said call being answered at said one station set and
enabling said switching arrangement in response to the received instructions including said second station set identity data, for establishing call connections to said second station set.

43. A call forwarding method for use by a switching arrangement interconnecting a plurality of station sets comprising
transmitting a message for an incoming call to one station set to place said one station set in an alerting state,
without said call being answered at said one station set, receiving a request transmitted from said one station set, to forward said call in response to a command at said one station set, said request including forward-to information, and
attempting to complete said call to another station set based on said forward-to information,
wherein said one station set is connected to said switching arrangement by at least one voice channel and at least one signaling channel out of band with respect to said voice channel, wherein said message is transmitted to said one station set in said signaling channel and said message defines that said call is to be completed to said voice channel, and wherein said request is received from said one station set in said signaling channel,
wherein said switching arrangement further comprises memory means for storing busy/idle data for said station sets and wherein said attempting to complete step comprises
determining a terminating station set in response to said forward-to information,
reading the busy/idle data for said determined terminating station set and
attempting to complete said call to said determined terminating station set only when said read busy/idle data defines that said determined terminating station set is idle.

44. A method in accordance with claim 43 further comprising
after successfully attempting to complete said call to said determined terminating station set for a predetermined time, attempting to complete said call to said one station set.

45. A method in accordance with claim 43 further comprising
receiving a request to pick up said call from said one station set,
when said call has not yet been successfully completed to said determined terminating station set, responding to said request to pick up said call by stopping the attempt to complete said call to said determined terminating station set and
attempting to complete said call to said one station set.

46. A method in accordance with claim 45 further comprising
when said call has been successfully completed to said determined terminating station set, responding to said request to pick up said call by bridging said one station set onto said call.

47. A call forwarding method for use by a switching arrangement interconnecting a plurality of station sets comprising
transmitting a message for an incoming call to one station set to place said one station set in an alerting state,
without said call being answered at said one station set, receiving a request transmitted from said one station set, to forward said call in response to a command at said one station set, said request including forward-to information, and
attempting to complee said call to another station set based on said forward-to information,
wherein said receiving step is performed during the existence of another call to said one station set.

48. A call forwarding method for use by a switching arrangement interconnecting a plurality of station sets comprising
transmitting a message for an incoming call to one station set to place said one station set in an alerting state,
without said call being answered at said one station set, receiving a request transmitted from said one station set, to forward said call in response to a command at said one station set, said request including forward-to information, and
attempting to complete said call to another station set based on said forward-to information,
wherein said switching arrangement further comprises memory means for storing busy/idle data for said station sets and wherein said attempting to complete step comprises
determining a terminating station set in response to said forward-to information,
reading the busy/idle data for said determined terminating station set and
attempting to complete said call to said determined terminating station set only when said read busy/idle data defines that said determined terminating station set is idle.

49. A call forwarding method for use by a switching arrangement interconnecting a plurality of station sets comprising transmitting a message for an incoming call to one station set to place said one station set in an alerting state, without said call being answered at said one station set, receiving a request transmitted from said one station set, to forward said call in response to a command at said one station set, said request including forward-to information, and attempting to complete said call to another station set based on said forward-to information, wherein said switching arrangement further comprises memory means for storing group data defining groups of said station sets, and wherein said attempting to complete step comprises determining a terminating station set in response to said forward-to information, reading the group data for said determined terminating station set and attempting to complete said call to said determined terminating station set only when said read group data defines that said determined terminating station set is in the same group with said one station set.

50. A call forwarding method for use by a switching arrangement interconnecting a plurality of station sets comprising transmitting a message for an incoming call to one station set to place said one station set in an alerting state, without said call being answered at said one station set, receiving a request transmitted from said one station set, to forward said call in response to a command at said one station set, said request including forward-to information, and attempting to complete said call to another station set based on said forward-to information, wherein said switching arrangement further comprises memory means for storing incoming call data for said station sets, wherein said method further comprises before said attempting to complete step is performed, reading the incoming call data for said one station set, and wherein said attempting to complete step is performed only when said read incoming call data defines an incoming call for said one station set.

51. A call forwarding method for use by a switching arrangement interconnecting a plurality of station sets comprising transmitting a message for an incoming call to one station set to place said one station set in an alerting state, without said call being answered at said one station set, receiving a request transmitted from said one station set, to forward said call in response to a command at said one station set, said request including forward-to information, and attempting to complete said call to another station set based on said forward-to information, wherein said switching arrangement further comprises memory means for storing data defining whether each of said station sets is assigned a SEND THIS CALL feature, wherein said method further comprises before said attempting to complete step is performed, reading the feature assignment data for said one station set, and wherein said attempting to complete step is performed only when said read feature assignment data defines that said SEND THIS CALL feature is assigned to said one station set.

52. A call forwarding method for use by a switching arrangement interconnecting a plurality of station sets comprising transmitting a message for an incoming call to one station set to place said one station set in an alerting state, without said call being answered at said one station set, receiving a request transmitted from said one station set, to forward said call in response to a command at said one station set, said request including forward-to information, and attempting to complete said call to another station set based on said forward-to information, after unsuccessfully attempting to complete said call to said another station set for a predetermined time, attempting to complete said call to said one station set.

53. A call forwarding method for use in a switching arrangement interconnecting a plurality of station sets comprising one station set, in response to an incoming call from said switching arrangement and to a command at said one station set while said one station set is in an alerting state, and without said call being answered, transmitting a request to said switching arrangement to forward said call, said request including forward-to information, and said switching arrangement attempting to complete said call to another station set based on said forward-to information, wherein said one station set is connected to said switching arrangement by at least one voice channel and at least one signaling channel out of band with respect to said voice channel, wherein said incoming call is to be completed to said voice channel and wherein said request is transmitted in said signaling channel, wherein said switching arrangement further comprises memory means for storing busy/idle data for said station sets and wherein said attempting to complete step comprises determining a terminating station set in response to said forward-to information, reading the busy/idle data for said determined terminating station set and attempting to complete said call to said determined terminating station set only when said busy/idle data defines that said determined terminating station set is idle.

54. A method in accordance with claim 53 further comprising after unsuccessfully attempting to complete said call to said determining terminating station set for a predetermined time, said switching arrangement again attempting to complete said call to said one station set.

55. A method in accordance with claim 53 further comprising said one station set transmitting to said switching arrangement a request to pick up said call, when said call has not yet been successfully completed to said determined terminating station set, said switching arrangement responding to said request to pick up said call by stopping the attempt to complete said call to said determined terminating station set and said switching arrangement attempting to complete said call to said one station set.

56. A method in accordance with claim 55 further comprising when said call has been successfully completed to said determined terminating station set, said switching arrangement responding to said request to pick up said call by bridging said one station set onto said call.

57. A call forwarding method for use in a switching arrangement interconnecting a plurality of station sets comprising one station set, in response to an incoming call from said switching arrangement and to a command at said one station set while said one station set is in an alerting state, and without said call being answered, transmitting a request to said switching arrangement to forward said call, said request including forward-to information, and said switching arrangement attempting to complete said call to another station set based on said forward-to information, wherein said transmitting step is performed during the existence of another call to said one station set.

58. A call forwarding method for use in a switching arrangement interconnecting a plurality of station sets comprising one station set, in response to an incoming call from said switching arrangement and to a command at said one station set while said one station set is in an alerting state, and without said call being answered, transmitting a request to said switching arrangement to forward said call, said request including forward-to information, and said switching arrangement attempting to complete said call to another station set based on said forward-to information, wherein said switching arrangement further comprises memory means for storing busy/idle data for said station sets and wherein said attempting to complete step comprises determining a terminating station set in response to said forward-to information, reading the busy/idle data for said determined terminating station set and attempting to complete said call to said determined terminating station set only when said read busy/idle data defines that said determined terminating station set is idle.

59. A call forwarding method for use in a switching arrangement interconnecting a plurality of station sets comprising one station set, in response to an incoming call from said switching arrangement and to a command at said one station set while said one station set is in an alerting state, and without said call being answered, transmitting a request to said switching arrangement to forward said call, said request including forward-to information, and said switching arrangement attempting to complete said call to another station set based on said forward-to information, wherein said switching arrangement further comprises memory means for storing group data defining groups of said station sets, and wherein said attempting to complete step comprises deermining a terminating station set in response to said forward-to information, reading the group data for said determined terminating station set and attempting to complete said call to said determined terminating station set only when said read group data defines that said determined terminating station set is in the same group with said one station set.

60. A call forwarding method for use in a switching arrangement interconnecting a plurality of station sets comprising one station set, in response to an incoming call from said switching arrangement and to a command at said one station set while said one station set is in an alerting state, and without said call being answered, transmitting a request to said switching arrangement to forward said call, said request including forward-to information, and said switching arrangement attempting to complete said call to another station set based on said forward-to information, wherein said switching arrangement further comprises memory means for storing incoming call data for said station sets, wherein said method further comprises before said attempting to complete step is performed, said switching arrangement reading the incoming call data for said one station set, and wherein said attempting to complete step is performed only when said read incoming call data defines an incoming call for said one station set.

61. A call forwarding method for use in a switching arrangement interconnecting a plurality of station sets comprising one station set, in response to an incoming call from said switching arrangement and to a command at said one station set while said one station set is in an alerting state, and without said call being answered, transmitting a request to said switching arrangement to forward said call, said request including forward-to information, and said switching arrangement attempting to complete said call to another station set based on said forward-to information, wherein said switching arrangement further comprises memory means for storing data defining whether each of said station sets is assigned a SEND THIS CALL feature, wherein said method further comprises before said attempting to complete step is performed, said switching arrangement reading the feature assignment data for said one station set, and wherein said attempting to complete step is performed only when said read feature assignment data defines that said SEND THIS CALL feature is assigned to said one station set.

62. A call forwarding method for use in a switching arrangement interconnecting a plurality of station sets comprising one station set, in response to an incoming call from said switching arrangement and to a command at said one station set while said one station set is in an alerting state, and without said call being answered, transmitting a request to said switching arrangement to forward said call, said request including forward-to information, said switching arrangement attempting to complete said call to another station set based on said forward-to information, and after unsuccessfully attempting to complete said call to said another station set for a predetermined time, said switching arrangement again attempting to complete said call to said one station set.

63. A call forwarding method for use by a switching arrangement interconnecting a plurality of station sets comprising transmitting a message for an incoming call to one station set to place said one station set in an alerting state, without said call being answered at said one station set, receiving a request to forward said call in response to a command at said one station set, said request including forward-to information, attempting to complete said call to another station set based on said forward-to information, receiving a request to pick up said call from said one station set, when said call has not yet been successfully completed to said another station set, responding to said request to pick up said call by stopping the attempt to complete said call to said another station set and attempting to complete said call to said one station set.

64. A method in accordance with claim 63 further comprising when said call has been successfully completed to said another station set, responding to said request to pick up said call by bridging said one station set onto said call.

65. A call forwarding method for use in a switching arrangement interconnecting a plurality of station sets comprising one station set, in response to an incoming call from said switching arrangement and to a command at said one station set while said one station set is in an alerting state, and without said call being answered, transmitting a request to said switching arrangement to forward said call, said request including forward-to information, said switching arrangement attempting to complete said call to another station set based on said forward-to information, said one station set transmitting to said switching arrangement a request to pick up said call, when said call has not been yet been successfully completed to said another station set, said switching arrangement responding to said request to pick up said call by stopping the attempt to complete said call to said another station set and said switching arrangement attempting to complete said call to said one station set.

66. A method in accordance with claim 65 further comprising when said call has been successfully completed to said another station set, said switching arrangement bridging said one station set onto said call.

* * * * *